(12) United States Patent
Bamba

(10) Patent No.: US 12,340,553 B2
(45) Date of Patent: Jun. 24, 2025

(54) IMAGE PROCESSING APPARATUS, LEARNING METHOD, AND STORAGE MEDIUM

(71) Applicant: CANON KABUSHIKI KAISHA, Tokyo (JP)

(72) Inventor: Yasuo Bamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 18/068,771

(22) Filed: Dec. 20, 2022

(65) Prior Publication Data

US 2023/0196715 A1    Jun. 22, 2023

(30) Foreign Application Priority Data

Dec. 21, 2021 (JP) ................................ 2021-207246

(51) Int. Cl.
*G06V 10/82* (2022.01)
*G06T 7/11* (2017.01)
*G06V 10/44* (2022.01)
*G06V 10/74* (2022.01)
*G06V 10/764* (2022.01)

(52) U.S. Cl.
CPC ................ *G06V 10/44* (2022.01); *G06T 7/11* (2017.01); *G06V 10/761* (2022.01); *G06V 10/764* (2022.01); *G06T 2207/20081* (2013.01); *G06T 2207/30201* (2013.01)

(58) Field of Classification Search
CPC .... G06V 10/44; G06V 10/761; G06V 10/764; G06V 10/82; G06V 40/171; G06V 40/172; G06T 7/11; G06T 2207/20081; G06T 2207/30201
See application file for complete search history.

(56) References Cited

U.S. PATENT DOCUMENTS 12,183,118 B2 *  12/2024  Singh ................... G06F 18/217
2006/0120571 A1 *  6/2006  Tu ........................ G06V 40/171
                                                              382/118

(Continued)

OTHER PUBLICATIONS

Alexey Dosovitskiy, et al., An Image is Worth 16×16 Words: Transformers for Image Recognition at Scale, ICLR 2021, arXiv:2010.11929v2 [cs.CV] Jun. 3, 2021.

(Continued)

*Primary Examiner* — Aaron W Carter
(74) *Attorney, Agent, or Firm* — Canon U.S.A., Inc. IP Division

(57) ABSTRACT

An image processing method includes acquiring a first image that represents an object, a second image that represents the object and is different from the first image in imaging condition, and identification information for identifying the object; extracting a feature amount from the second image by using an extractor; classifying the object by using the feature amount and a classifier; restoring by generating a restored image close to the first image from the second image, using the feature amount and a generator; and training the extractor and the generator such that values corresponding to a first difference between a result of classification of the object and the identification information and a second difference between the restored image and the first image become small.

12 Claims, 13 Drawing Sheets

(56) References Cited

U.S. PATENT DOCUMENTS

| | | | | |
|---|---|---|---|---|
| 2010/0272350 | A1* | 10/2010 | Lee | G06V 10/70 382/165 |
| 2011/0091113 | A1* | 4/2011 | Ito | G06V 40/165 382/197 |
| 2013/0142401 | A1* | 6/2013 | Nomoto | G06F 18/24 382/118 |
| 2016/0210500 | A1* | 7/2016 | Feng | G06V 10/7553 |
| 2017/0032179 | A1* | 2/2017 | Al-Qunaieer | G06V 40/172 |
| 2018/0285629 | A1* | 10/2018 | Son | G06V 10/809 |
| 2020/0012887 | A1* | 1/2020 | Li | G06V 10/809 |
| 2021/0158021 | A1* | 5/2021 | Wu | G06V 10/764 |
| 2021/0374468 | A1* | 12/2021 | Chandraker | G06N 3/084 |
| 2022/0058426 | A1* | 2/2022 | Song | G06N 3/045 |
| 2022/0100989 | A1* | 3/2022 | Zhu | G06F 21/602 |
| 2022/0172846 | A1* | 6/2022 | Min | G16H 50/20 |
| 2023/0033052 | A1* | 2/2023 | Qiu | G06V 40/171 |
| 2023/0196714 | A1* | 6/2023 | Bamba | G06V 10/32 382/190 |
| 2023/0196715 | A1* | 6/2023 | Bamba | G06V 40/172 382/190 |
| 2023/0237841 | A1* | 7/2023 | Li | G06V 10/774 382/157 |
| 2023/0260312 | A1* | 8/2023 | Agrawal | G06V 30/422 382/113 |
| 2024/0071130 | A1* | 2/2024 | Kimura | G06N 3/0455 |
| 2024/0087364 | A1* | 3/2024 | Tate | G06V 10/44 |
| 2024/0135643 | A1* | 4/2024 | Wang | G06V 10/54 |
| 2024/0152549 | A1* | 5/2024 | Bamba | G06V 40/172 |
| 2024/0177359 | A1* | 5/2024 | Krishnan | G06T 11/00 |
| 2024/0198230 | A1* | 6/2024 | Krishnan | A63F 13/213 |

OTHER PUBLICATIONS

Qingyan Duan, et al., BoostGAN for Occlusive Profile Face Frontalization and Recognition, arXiv:1902.09782v1 [cs.CV] Feb. 26, 2019.

Jiankang Deng, et al., ArcFace: Additive Angular Margin Loss for Deep Face Recognition, 2019 IEEE/CVF Conference on Computer Vision and Pattern Recognition (CVPR), 2019.

Yaoyao Zhong, et al., Face Transformer for Recognition, arXiv:2103.14803v2 [cs.CV] Apr. 13, 2021.

* cited by examiner

IMAGE PROCESSING APPARATUS, LEARNING METHOD, AND STORAGE MEDIUM

BACKGROUND OF THE DISCLOSURE

Field of the Disclosure

The present disclosure particularly relates to an image processing apparatus that is preferably used to train a feature extractor or the like that extracts a feature amount of an object.

Description of the Related Art

In recent years, there have been proposed many feature extraction techniques for performing advanced processing on an image of an object seen in a captured image to extract useful information. Among the feature extraction techniques, in particular, there are many techniques related to feature extractors that extract feature vectors of an object in an image by using a multi-level neural network called a deep network (or deep neural network or deep learning).

A feature extractor is trained by a technique called distance learning, for example. In distance learning, first, the distance between feature vectors is defined. The definition of the distance is the Euclidean distance or the cosine similarity, for example. In distance learning, the feature extractor is trained to output feature vectors at a short distance from each other for images of an identical object or objects belonging to an identical class, and output feature vectors at a long distance from each other for images of non-identical objects or objects belonging to non-identical classes. Known application examples of distance learning include vehicle identity determination, face recognition, and the like. In particular, a technique for realizing face recognition using distance learning is discussed in Deng (Deng, Jiankang, et al., "Arcface: Additive angular margin loss for deep face recognition", Proceedings of the IEEE Conference on Computer Vision and Pattern Recognition, 2019).

On the other hand, images of an identical person include ideal images for which the imaging conditions are all good (hereinafter, ideal images) and non-ideal images for which at least some of the imaging conditions are not good because the person does not face the front or is occluded by an object (hereinafter, non-ideal images). Therefore, there is a possibility that the feature vectors may not be close to each other between the ideal image and the non-ideal image. In general, the accuracy of face recognition is high in a case of using only ideal images as trained registered images and verification images, whereas the accuracy of face recognition is low in a case of using non-ideal images as registered images and verification images.

Thus, Duan discusses an image generator (BoostGAN) that restores an ideal image of the subject facing the front without occlusion from a non-ideal image of the subject of which the face is in profile and partially occluded (Duan, Qingyan, and Lei Zhang, "Boostgan for occlusive profile face frontalization and recognition", arXiv preprint arXiv: 1902.09782(2019)).

The technique discussed in Duan is designed such that the loss to be learned by BoostGAN includes information indicating the identity of the face indicated by the restored ideal face image. The loss is defined by an error between the feature amount obtained by inputting the restored face image to a known feature extractor and the feature amount obtained by inputting a ground truth ideal image to the same feature extractor. According to the method discussed in Duan, it is considered that the performance of face recognition can be improved by using the face image restored by BoostGAN.

However, in order to train a generator by the method discussed in Duan, it is necessary to prepare a trained feature extractor. Thus, it is unfeasible to train the feature extractor and the generator at the same time.

SUMMARY OF THE DISCLOSURE

The present disclosure is directed to enabling training of a feature extractor and a generator configured to restore an ideal image from a feature amount output from the feature extractor such that the feature extractor and the generator are totally optimized at the same time.

According to an aspect of the present disclosure, an image processing apparatus includes a processor, and a memory storing executable instructions which, when executed by the processor, cause the image processing apparatus to perform operations including acquiring a first image that represents an object, a second image that represents the object and is different from the first image in imaging condition, and identification information for identifying the object, extracting a feature amount from the second image by using an extractor, classifying the object by using the feature amount and a classifier, generating a restored image close to the first image from the second image, using the feature amount and a generator, and training the extractor and the generator such that values corresponding to a first difference between a result of classification of the object and the identification information and a second difference between the restored image and the first image become small.

Further features of the present disclosure will become apparent from the following description of exemplary embodiments with reference to the attached drawings.

DESCRIPTION OF THE EMBODIMENTS

Figure 1:
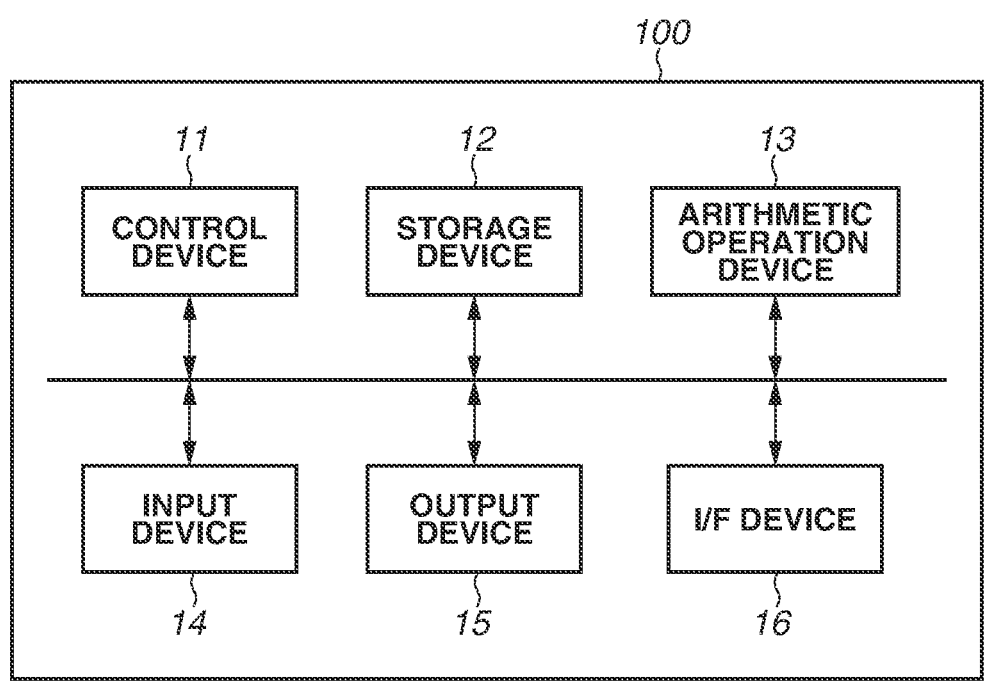
FIG. 1 is a block diagram illustrating a hardware configuration example of an image processing apparatus.

Hereinafter, Exemplary embodiments of the present disclosure will be described in detail with reference to the drawings. The configurations described in relation to the following exemplary embodiments are mere examples, and the present disclosure is not limited to the configurations illustrated in the drawings. In the following description, a feature extractor that extracts feature vectors for determining the identity of a human face from input images of the human face (hereinafter, face images) will be taken as an example. However, the object from which the feature vectors are to be extracted is not limited to the face and may be any object from which the identity can be determined by feature vectors.

FIG. 1 is a block diagram illustrating a hardware configuration example of an image processing apparatus 100 according to the present exemplary embodiment. The image processing apparatus 100 includes, as hardware components, a control device 11, a storage device 12, an arithmetic operation device 13, an input device 14, an output device 15, and an input/output (I/F) device 16.

The control device 11 controls the entire image processing apparatus 100. The storage device 12 holds programs and data for operating the control device 11. The arithmetic operation device 13 executes arithmetic operation processes under control of the control device 11. The input device 14 is a human interface device or the like, which inputs user operations to the image processing apparatus 100. The output device 15 is a display or the like, which provides the results of processing by the image processing apparatus 100 to the user.

The I/F device 16 is a wired interface such as a universal serial bus, a local area network, or an optical cable, or a wireless interface such as Wi-Fi or Bluetooth®. The I/F device 16 is connected to a camera or the like to input captured images to the image processing apparatus 100 or transmit processing results obtained by the image processing apparatus 100 to the outside.

The I/F device 16 further inputs programs and various types of data for operating the image processing apparatus 100 to the image processing apparatus 100 as needed.

Figure 2:
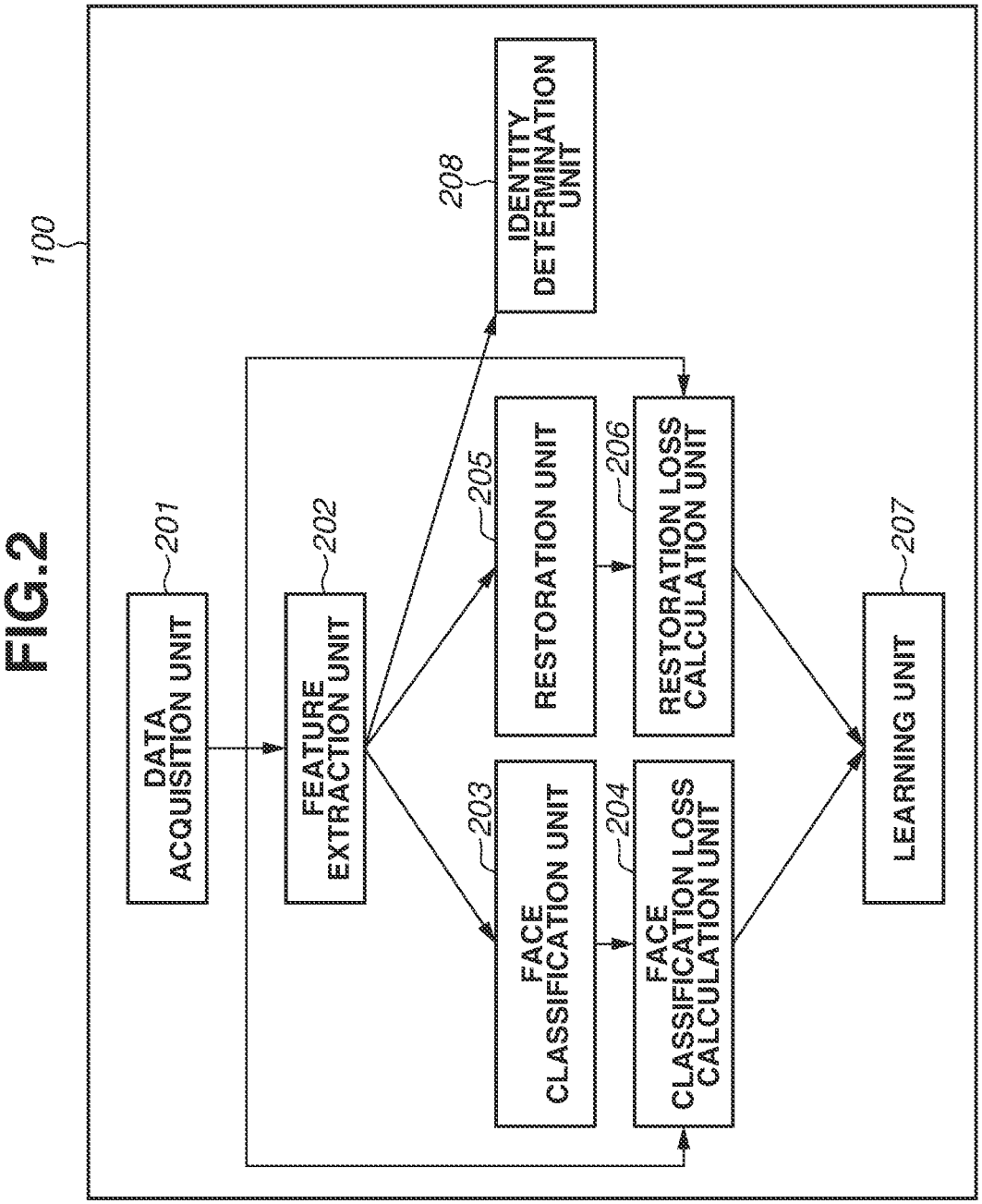
FIG. 2 is a block diagram illustrating a functional configuration example of the image processing apparatus.

FIG. 2 is a block diagram illustrating a functional configuration example of the image processing apparatus 100 according to the present exemplary embodiment.

The image processing apparatus 100 has, as functional components, a data acquisition unit 201, a feature extraction unit 202, a face classification unit 203, a face classification loss calculation unit 204, a restoration unit 205, a restoration loss calculation unit 206, a learning unit 207, and an identity determination unit 208.

The data acquisition unit 201 acquires data for learning and inference. For example, the data acquisition unit 201 acquires samples (combinations of an ideal image, a non-ideal image, and a person ID) that are selected at random from learning data collected in advance at the time of learning, and acquires an input image of a person as a target of face recognition (hereinafter, image to be inferred) at the time of inference.

The definitions of the ideal image and the non-ideal image will be described. The ideal image refers to an image that is captured under ideal imaging conditions as listed below.

Occlusion: The face is not occluded, partially or entirely, by a mask, sunglasses, a human body part, or the like.

Face orientation: Oriented at the front. Facial expressions: Straight face with no emotion or mood.

Image quality: High enough to recognize the face texture. Illumination: No overexposure or shadow-detail loss.

Background: Not disordered or no other persons' faces.

On the other hand, the non-ideal image refers to an image in which at least one of the above-described imaging conditions is not met. That is, the non-ideal image refers to an image of an object that is captured under imaging conditions different from those for the ideal image.

The ideal image and non-ideal image acquired by the data acquisition unit 201 at the time of learning are images in which only one face is seen and the face is of the identical person. The person ID is identification information on the person seen in the ideal image and the non-ideal image, and the person ID is assigned any value of 1 to C. Only one face is seen in the image to be inferred as well. The face images acquired by the data acquisition unit 201 may be images stored in the storage device 12 or may be captured images received from the I/F device 16 via a network such as the Internet.

The feature extraction unit 202 (extractor) extracts a feature amount for determining the identity of the face seen in the face image, from the face image acquired by the data acquisition unit 201 (the non-ideal image at the time of learning and the image to be inferred at the time of inference). The following description is based on the assumption that a vector having a fixed dimension (hereinafter, feature vector) is extracted as the feature amount. However, the type of the feature amount is not limited to this. For example, the feature amount may be a tensor of two or more levels. Hereinafter, the dimension of the feature vector will be designated as D.

The face classification unit 203 (classifier) receives the D-dimensional feature vector extracted by the feature extraction unit 202, and outputs a C-dimensional probability vector. An i-th component of the probability vector (i is an integer of 1 or more and C or less) expresses the probability that the person ID of the face seen in the face image is i. The face classification loss calculation unit 204 calculates a face classification loss from the probability vector output by the face classification unit 203 and the person ID acquired by the data acquisition unit 201.

The restoration unit 205 (generator) receives the D-dimensional feature vector extracted by the feature extraction unit 202, and restores an image as close to the ideal image as possible (hereinafter, image to be restored). The restoration loss calculation unit 206 calculates a restoration loss from the image restored by the restoration unit 205 and the ideal image acquired by the data acquisition unit 201.

The learning unit 207 adjusts the parameters held by the feature extraction unit 202, the face classification unit 203, and the restoration unit 205, such that the weighted sum of the face classification loss calculated by the face classification loss calculation unit 204 and the restoration loss calculated by the restoration loss calculation unit 206 becomes small. The identity determination unit 208 receives the feature vector extracted by the feature extraction unit 202 and determines whether the faces seen in the images are of the identical person.

Next, an example of a flow of a learning process by the image processing apparatus 100 according to the present exemplary embodiment will be described with reference to the flowchart in FIG. 3 and the schematic diagram in FIG. 4.

In step S301, the learning unit 207 of the image processing apparatus 100 initializes the parameters that are learning subjects. The parameters as learning subjects here refer to the parameters held by the feature extraction unit 202, the face classification unit 203, and the restoration unit 205. The parameters are initialized by random initialization or zero initialization. The parameters may be initialized by parameters already learned at other tasks, within a framework of transfer learning.

In step S302, the data acquisition unit 201 acquires data for learning. Specifically, the data acquisition unit 201 acquires samples (combinations of an ideal image, a non-ideal image, and a person ID) at random from learning data collected in advance.

Figure 5A:
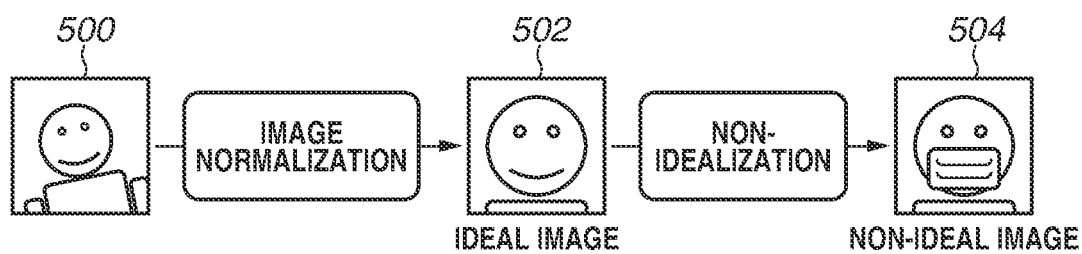
FIGS. 5A and 5B are diagrams for describing specific exemplary methods for collecting learning data.

Hereinafter, specific exemplary methods for collecting learning data will be described. The following description is based on the assumption that the ideal image is an image of a face that is oriented at the front and is not occluded, and the non-ideal image is an image of a face that is oriented with a shift from the front or is at least partially occluded. A first collection method is to collect only ideal images and artificially generates non-ideal images from the ideal images. Hereinafter, this method will be described with reference to FIG. 5A. First, a large number of ideal images with known person IDs is collected. An image 500 illustrated in FIG. 5A is an example of collected ideal images.

Next, a normalization process is performed on the collected ideal images. Hereinafter, the images having undergone the normalization process will be called normalized images. The normalized images are images which are extracted to have a predetermined number of pixels in both vertical width and lateral width and in which a face is not inclined to the right or left and is almost constant in size and position relative to the image. The purpose of the normalization process is to reduce variation in the in-plane rotation angle and size of the faces seen in the face images. An image 502 illustrated in FIG. 5A is an example of a result of the normalization process on the image 500. The normalization process will be described below in detail.

Next, a non-idealization process is performed on the ideal images having undergone the normalization process. The non-idealization process refers to a process of artificially changing at least one of imaging conditions such as "occlusion" and "image quality" such that the accuracy of the face recognition becomes lower. An example of the non-idealization process is a process of partially occluding the face. As an occluding method, the face may be occluded by filling random portions in the face image in a single color or by superimposing a material prepared in advance such as a mask image or a sunglass image on the mouth or eyes. The superimposition can be implemented by using a known technique for estimating the positions of organ points such as the mouth or eyes.

Another example of the non-idealization process is a process of reducing the quality of the face image. For example, this process corresponds to superimposing Gaussian noise on the face image, applying blurring to the face image, compressing the face image by a lossy compression method such as Joint Photographic Experts Group (JPEG) and then decompressing the same, or adjusting the contrast or brightness of the face image to cause overexposure or shadow-detail loss. Still another example of the non-idealization process is a process of disordering the background part of the face image. For example, this process corresponds to superimposing complicated texture on the background or superimposing a portion of another person's face on the background.

An image 504 illustrated in FIG. 5A is an exemplary result of the non-idealization process on the image 502, and the image 504 is an example in which a mask image is superimposed on the face seen in the image 502.

Figure 6:
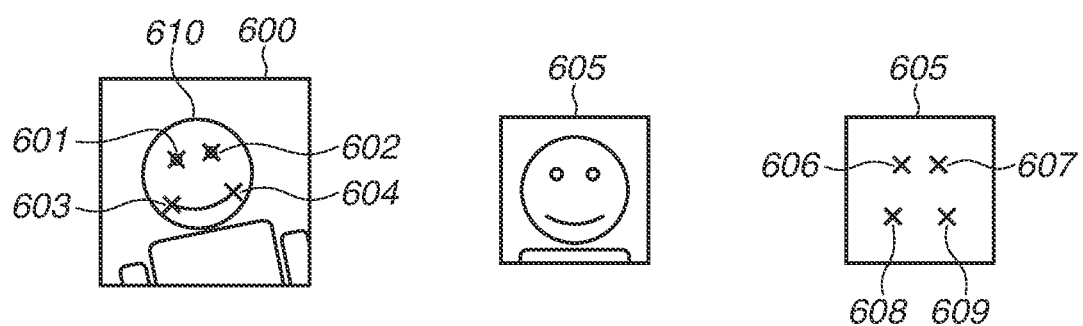
FIG. 6 is a diagram for describing an example of a normalization process of a face image.

An example of the normalization process on the face image will be described with reference to FIG. 6. A face image 600 is an image that represents one face 610. In the normalization process, a known organ point position estimation technique is used to estimate the positions of organ points such as the eyes, nose, and mouth of the face 610 in the face image 600. In the example of FIG. 6, a right-eye center 601, a left-eye center 602, a right oral end 603, and a left oral end 604 are estimated. Then, based on the estimated positions of the organ points, a normalized face image 605 is extracted from the face image 600. The extraction is implemented, for example, by applying geometric transformation such as affine transformation to the face image 600 such that the right-eye center 601, the left-eye center 602, the right oral end 603, and the left oral end 604 come into close to predetermined positions 606, 607, 608, and 609 in the normalized face image 605, respectively.

As described above, in the first collection method, learning data is formed by the collected ideal images, the non-ideal images artificially generated from the ideal images, and the person IDs collected at the same time as the collection of the ideal images.

A second collection method of learning data is a method using ideal images and non-ideal images in pairs. Hereinafter, this method will be described with reference to FIG. 5B. For example, if an ideal image is an image of a "frontal face" and a non-ideal image is an image of a "face in profile", it is difficult to perform the non-idealization process on the ideal image to generate the non-ideal image. In such a case, the second collection method is used.

Figure 5B:
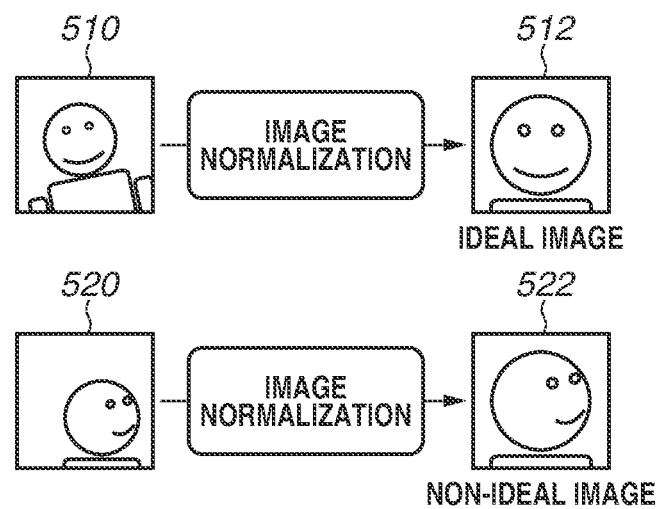

In this method, first, a large number of pairs of an ideal image and a non-ideal image with known person IDs are collected. Images 510 and 520 illustrated in FIG. 5B are an exemplary collected pair of an ideal image and a non-ideal image. The image 510 and the image 520 are of the same person ID, but a frontal face is seen in the image 510 and a slanted face is seen in the image 520.

Then, the normalization process is performed on the collected ideal images and non-ideal images. The detailed procedure of the normalization process is basically similar to the procedure described above. However, if there are images of faces in a wide variety of orientations, geometric transformation may be performed at predetermined different positions of organ points that are defined in accordance with the orientation of the face. For example, the face orientations are classified into five classes of leftward, diagonally leftward, front, diagonally rightward, and rightward, so that the predetermined positions of organ points can be differently defined by class. The images 512 and 522 are exemplary results of the normalization process on the images 510 and 520, respectively.

As described above, in the second collection method, learning data is formed by the pairs of collected ideal and non-ideal images and the person IDs.

The data acquisition unit 201 acquires samples (combinations of an ideal image, a non-ideal image, and a person ID) at random from the learning data collected by any of the above-described collection methods. In general, a plurality of samples is frequently acquired for mini-batch learning in a deep network. This promises higher-speed and stable learning.

Figure 3:
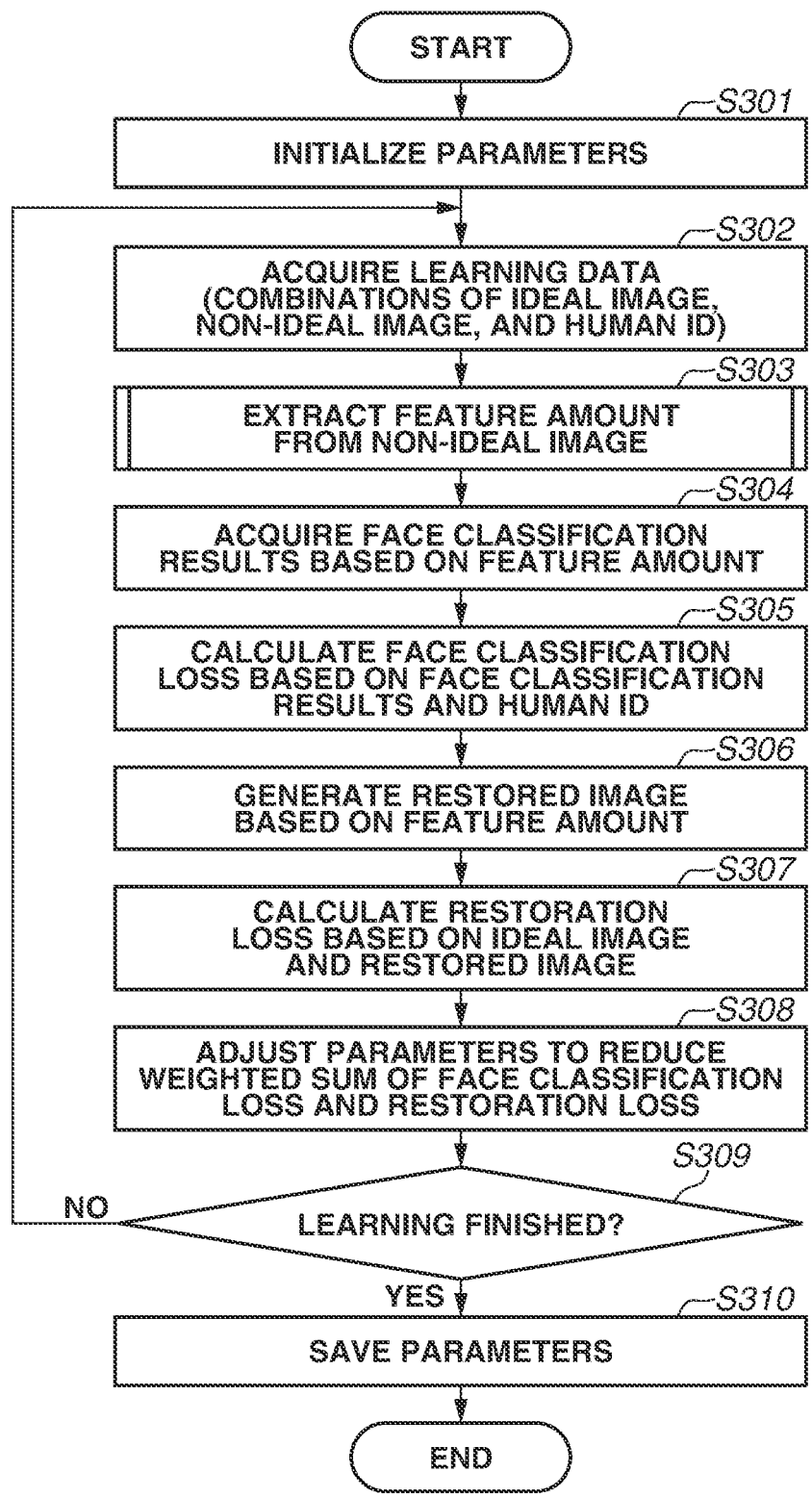
FIG. 3 is a flowchart of an example of a procedure of a learning process by the image processing apparatus.
Figure 4:
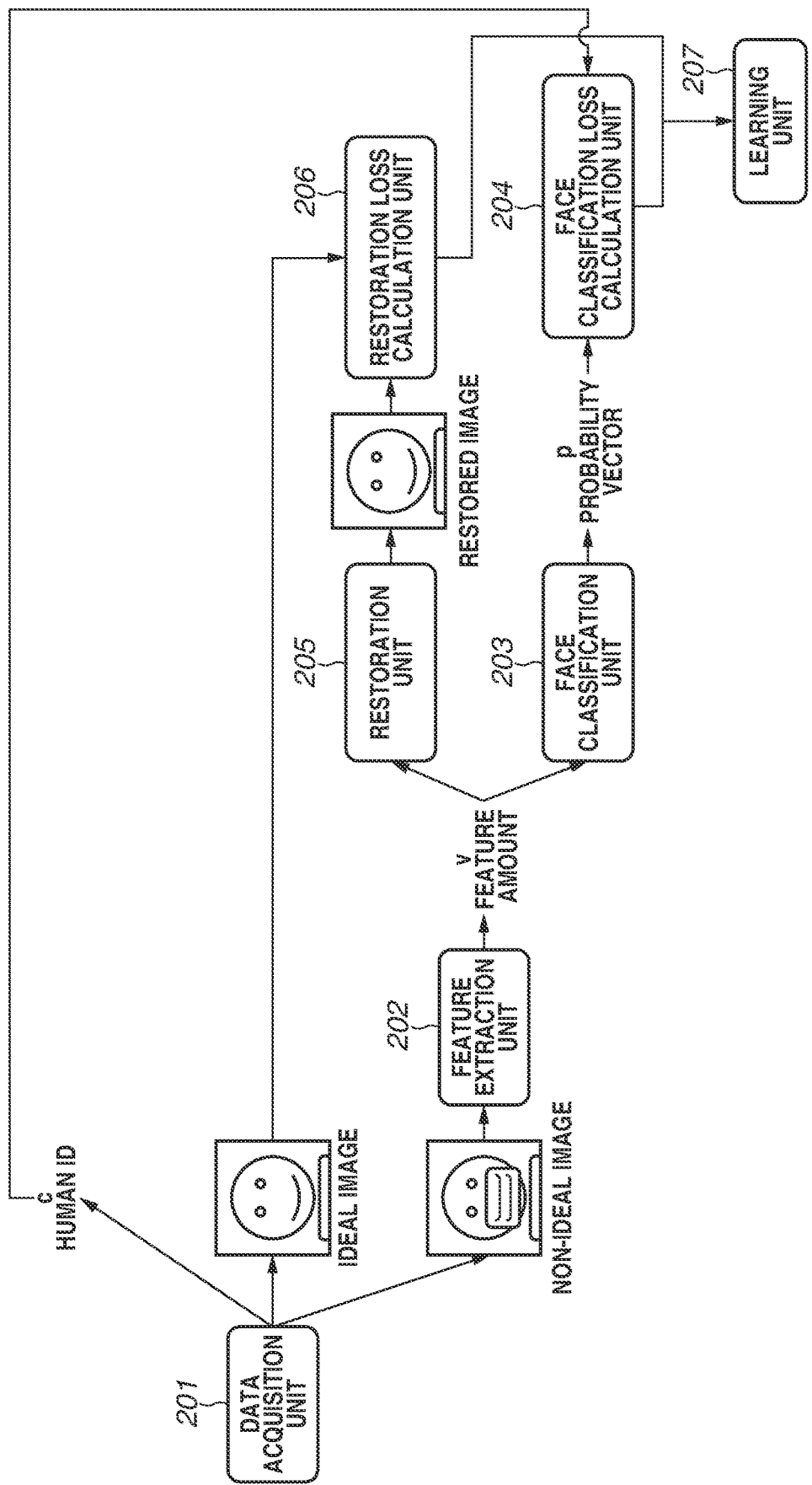
FIG. 4 is a schematic diagram for describing the procedure of the learning process by the image processing apparatus.

Returning to the description with reference to FIG. 3, in step S303, the feature extraction unit 202 extracts a feature amount (in this example, a D-dimensional feature vector) for determining the identity of the faces seen in the face images, from the non-ideal images of the samples acquired by the data acquisition unit 201. The value of D is typically 256, 512, 1024, or the like.

In this example, any deep network can be used as the feature extraction unit 202. For example, a deep network including a convolutional neural network can be utilized as the feature extraction unit 202. As an example, a deep network called ResNet as discussed in Deng can be utilized as the feature extraction unit 202. Otherwise, a deep network including a Transformer model may be utilized as the feature extraction unit 202. It is known that the use of a Transformer model, which has been widely used in the field of natural language processing, for image classification achieves image classification performance that is equivalent to or higher than that in the case of using a convolutional neural network (see Dosovitskiy, Alexey, et al., "An image is worth 16×16 words: Transformers for image recognition at scale", arXiv preprint arXiv: 2010.11929(2020)). In addition, as discussed in Zhong, a neural network including a Transformer model may be used as the feature extraction unit 202 for face recognition (Zhong, Yaoyao, and Weihong Deng., "Face Transformer for Recognition", arXiv preprint arXiv: 2103.14803(2021)).

Figure 7:
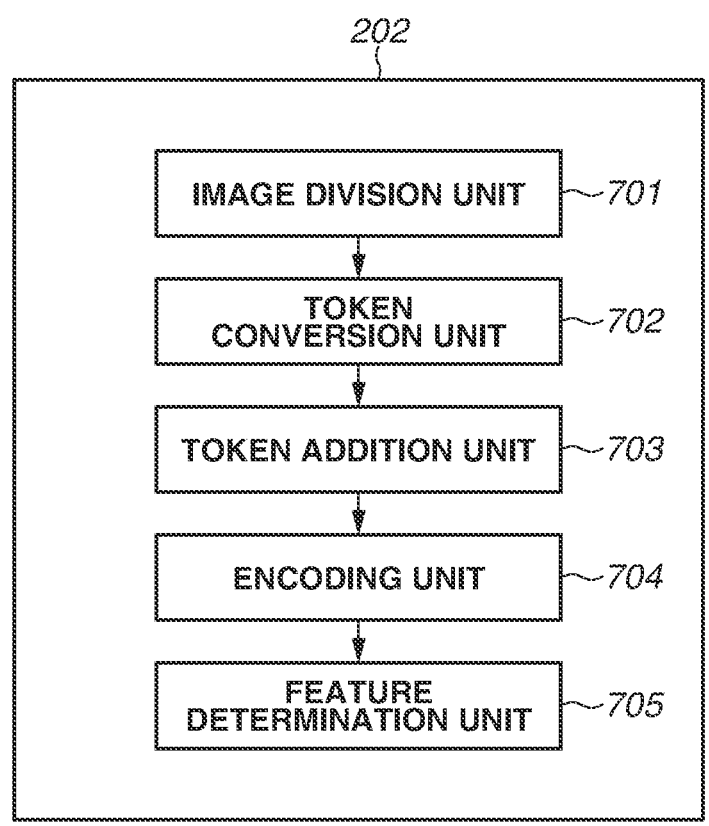
FIG. 7 is a block diagram illustrating a detailed functional configuration example of a feature extraction unit.

Hereinafter, the case of using a Transformer model as the feature extraction unit 202 will be described in detail. FIG. 7 is a block diagram illustrating a detailed functional configuration example of the feature extraction unit 202. The feature extraction unit 202 has an image division unit 701, a token transformation unit 702, a token addition unit 703, an encoding unit 704, and a feature determination unit 705.

The image division unit 701 receives and divides a normalized face image into partial images with a predetermined number of pixels in both vertical width and lateral width to acquire a partial image string. The token transformation unit 702 transforms the partial image string acquired by the image division unit 701 into a token string. The token here refers to a vector with a fixed dimension $D_1$. The transformation from the partial images into the tokens is performed by flattening and transforming the partial image into a vector, subjecting the vector to linear transformation to turn the dimension number of the vector to $D_1$. The linear transformation may include not only a process of applying a weighting matrix to the input but also a process of adding a bias vector to the input to which the weighting matrix has been applied.

The token addition unit 703 adds a $D_1$-dimensional token called a class token to the token string acquired by the token transformation unit 702. The encoding unit 704 performs an encoding process of updating the token string acquired by the token addition unit 703 one or more times. The encoding process will be described below in detail. The finally obtained token string will be called an encoded expression string.

The feature determination unit 705 extracts the D-dimensional feature vector as a feature amount from the encoded expression string acquired by the encoding unit 704. An example of a flow of feature amount extraction by the feature extraction unit 202 will be described with reference to the flowchart in FIG. 8 and the schematic diagram in FIG. 9.

Figure 8:
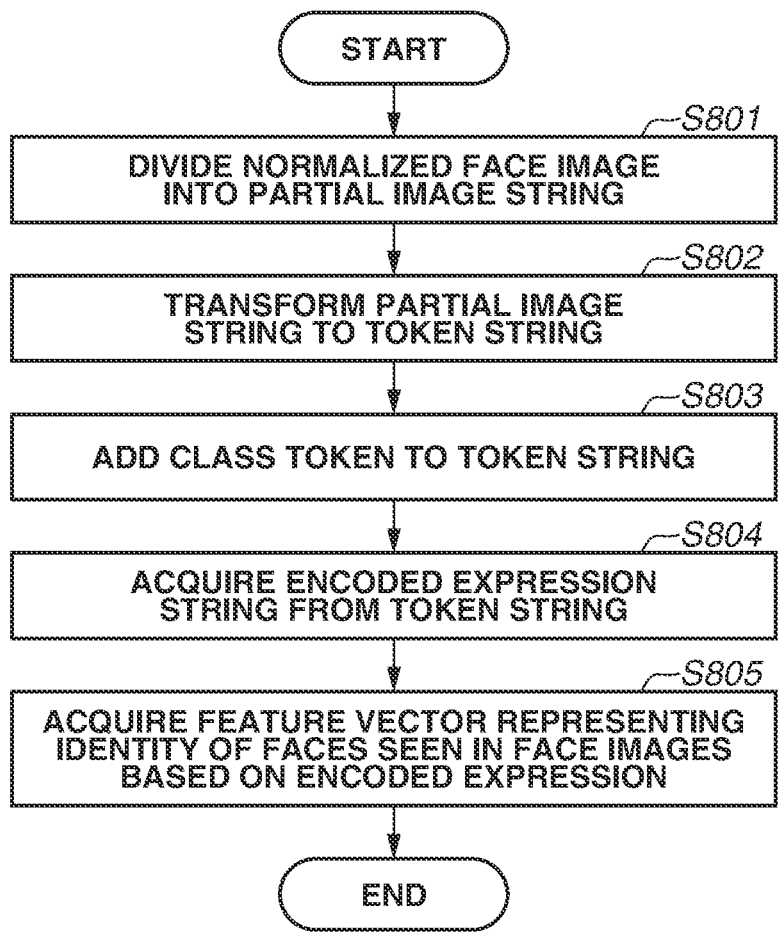
FIG. 8 is a flowchart of an example of a detailed process procedure for acquiring a feature vector.

FIG. 8 is a flowchart of an example of a detailed processing procedure in step S303 of FIG. 3. Hereinafter, the steps in the flowchart of FIG. 8 will be described with reference to FIG. 9.

Figure 9:
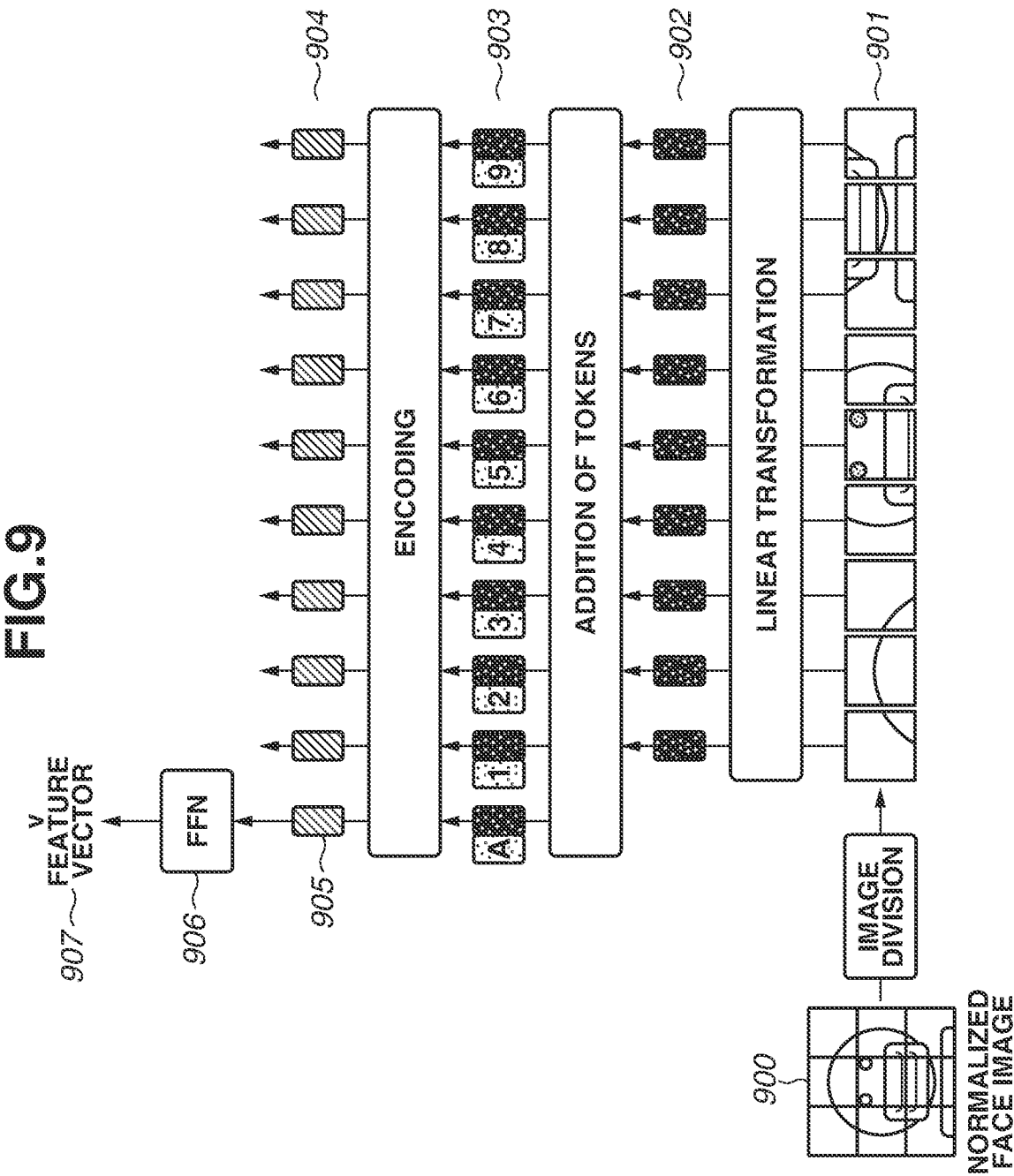
FIG. 9 is a schematic diagram for describing a detailed process procedure for acquiring a feature vector.

In step S801, the image division unit 701 divides a normalized face image 900 into partial images with a predetermined number of pixels in both vertical width and lateral width to acquire a partial image string 901. In this example, the image division unit 701 divides the normalized face image 900 such that every pixel in the normalized face image 900 belongs to one corresponding partial image, that is, such that there is no gap or overlap between the partial images. Hereinafter, the vertical width of the normalized face image will be defined as H pixels, the lateral width of the normalized face image will be defined as W pixels, the vertical width of the partial image will be defined as $P_H$ pixels, the lateral width of the partial image will be defined as $P_W$ pixels, and the number of channels will be defined as C. It is assumed that H can be evenly divided by $P_H$, W can be evenly divided by $P_W$, and a length N of the partial image string is expressed as $(H/P_H) \times (W/P_W)$. In the example of FIG. 9, the length N of the partial image string 901 is 9. However, the manner in which to divide into partial images is not limited to this. As discussed in Zhong, the image may be divided such that the partial images overlap by a predetermined number of pixels.

In step S802, the token transformation unit 702 transforms the partial image string 901 acquired by the image division unit 701 into a token string 902. Hereinafter, an example of transformation of partial images into tokens will be described. First, the partial image is flattened to obtain a vector with a dimension number of $P_H P_W C$. Then, this vector is subjected to linear transformation to obtain a vector (token) with a dimension number of $D_1$. The parameters for linear transformation are learned by the learning unit 207 in step S308 described below.

In step S803, the token addition unit 703 adds one $D_1$-dimensional token, which is called a class token, to the token string 902 acquired by the token transformation unit 702 to obtain a new token string 903. As a result of this processing, the length of the token string becomes N+1 (=N'). The parameters for a class token are learned by the learning unit 207 in step S308 described below.

In the example of FIG. 9, the token positioned at the left end of the token string 903 is a class token.

The token addition unit 703 may further add a $D_1$-dimensional vector called a position embedding vector to each of the N' tokens. In this example, the position embedding vector has a value varying depending on the position in the token string 903, and holds information on the position in the normalized face image 900 to which each token corresponds. The position embedding vector may be artificially designed or may be learned by the learning unit 207 in step S308 described below.

In step S804, the encoding unit 704 performs an encoding process on the token string 903 acquired by the token addition unit 703 one or more times. In this example, the encoding process refers to a process of updating the tokens constituting the token string, based on the relevance of the tokens.

In order to perform the encoding process, a method using "Transformer Encoder" discussed in Dosovitskiy is adopted, for example.

Hereinafter, the method for performing the encoding process using the Transformer Encoder will be described.

Figure 10:
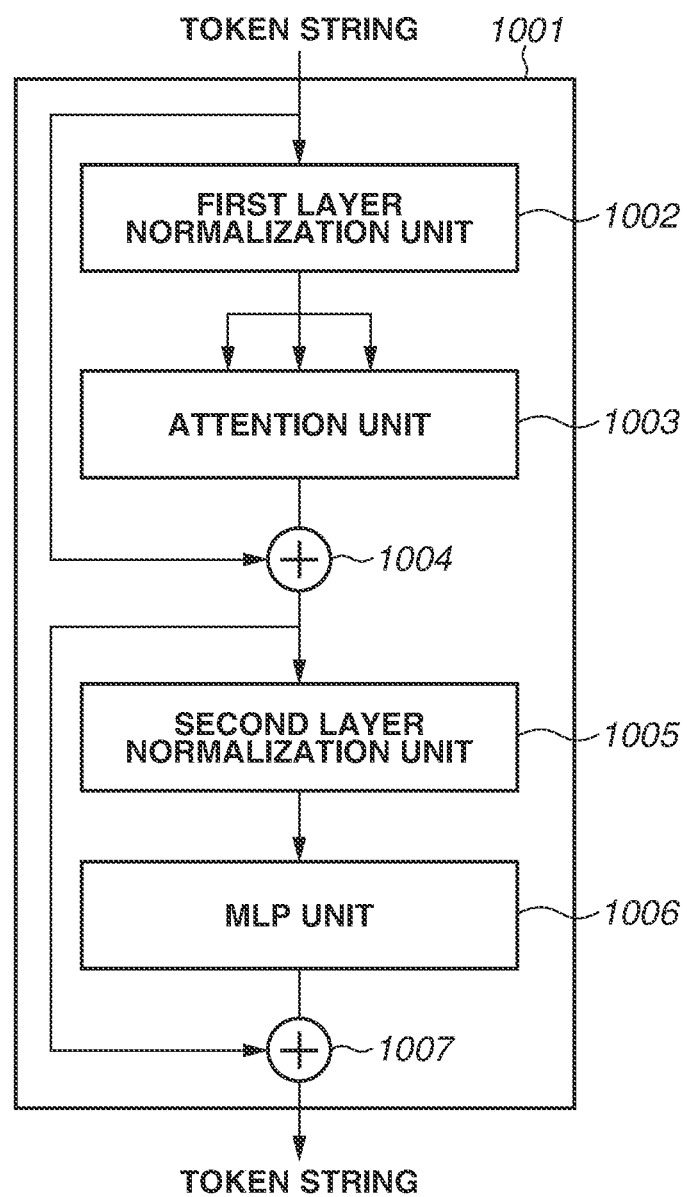
FIG. 10 is a block diagram illustrating an example of a configuration for performing one iteration of an encoding process by a Transformer Encoder.

FIG. 10 is a block diagram illustrating an example of a configuration for performing one iteration of the encoding process by a Transformer Encoder 1001. The Transformer Encoder 1001 is configured to accept an input of a token string and output a token string. The Transformer Encoder 1001 has a first layer normalization unit 1002, an attention unit 1003, and a first skip connection unit 1004. The Transformer Encoder 1001 further has a second layer normalization unit 1005, a multi-layer perceptron (MLP) unit 1006, and a second skip connection unit 1007.

The token string is first input to the first layer normalization unit 1002. The first layer normalization unit 1002 subjects the token string to normalization called layer normalization to normalize each of the tokens independently. The parameters for the layer normalization are learned by the learning unit 207 in step S308 described below.

The token string normalized by the first layer normalization unit 1002 is updated by the attention unit 1003. The attention unit 1003 has M (M is an integer of 1 or larger) attention mechanisms. In a case of M>1, the M attention mechanisms achieve different parameter weights through learning by the learning unit 207, so that the relevance of the tokens can be discovered from a plurality of aspects.

A method by which to update the token string by one of the M attention mechanisms will be described. The token string is expressed by a matrix of $N' \times D_1$. The token string is multiplied by weighting matrixes $U_Q$, $U_K$, and $U_V$ achieved in advance through the learning by the learning unit 207 to obtain a query matrix Q, a key matrix K, and a value matrix V. The weighting matrixes $U_Q$, $U_K$, and $U_V$ all have a size of $D_1 \times D_h$, and the query matrix Q, the key matrix K, and the value matrix V all have a size of $N' \times D_h$, where $D_h$ is a dimension number of a vector output by each attention mechanism and is usually set to $D_1/M$.

Next, an attention matrix A is obtained by the following equation (1) using a softmax function.

The attention matrix A has a size of $N' \times N'$, which reflects all the tokens and the degrees of relevance of all the tokens.

$$A = \text{softmax}(QK^T/\sqrt{D_h}) \quad (1)$$

The attention matrix A is multiplied by the value matrix V to obtain a matrix with a size of $N' \times D_n$. It can be construed that this matrix is obtained by updating the value of each token by taking the weighted sum of the value values of the other tokens, in accordance with the degree of relevance with the other tokens.

The calculation described above is performed on each of the M attention mechanisms, thereby to obtain M matrixes with a size of $N' \times D_n$, and these matrixes are connected into a matrix of $N' \times D_1$. This matrix is multiplied by a matrix with a size of $D_1 \times D_1$ obtained through the learning by the learning unit 207, thereby to obtain a matrix of $N' \times D_1$ into which the calculation results of the M attention mechanisms are integrated. The attention unit 1003 finally outputs the token string expressed by this matrix.

The first skip connection unit 1004 adds up the token string before input to the first layer normalization unit 1002 and the token string output from the attention unit 1003. The second layer normalization unit 1005 performs layer normalization on the token string output from the first skip connection unit 1004. The layer normalization performed by the second layer normalization unit 1005 is similar to the layer normalization performed by the first layer normalization unit 1002.

The MLP unit 1006 performs linear transformation, non-linear activation, and linear transformation in order independently on each of the tokens in the token string having undergone the layer normalization by the second layer normalization unit 1005. The parameters for linear transformation are learned by the learning unit 207 in step S308 described below. Examples of the non-linear activation process include Rectified Linear Unit (ReLU), Gaussian Error Linear Unit (GELU), and the like. The output of the MLP unit 1006 is a matrix with a size of $N' \times D_1$. The second skip connection unit 1007 adds up the output of the first skip connection unit 1004 and the output of the MLP unit 1006.

As described above, the output of the second skip connection unit 1007 is obtained by one encoding process by the Transformer Encoder 1001. As stated above, a token string obtained by performing a process of updating a token string one or more times by using an encoder such as a Transformer Encoder is defined as an encoded expression string.

Returning to the description with reference to FIG. 8, in step S805, the feature determination unit 705 uses an encoded expression string 904 acquired by the encoding unit 704 to acquire a feature vector 907 for determining the identity of the faces seen in the face images. There are various methods for acquiring a feature vector. Hereinafter, some methods for acquiring a feature vector will be described.

A first method for acquiring a feature vector is to use an encoded expression 905 corresponding to the class token as it is. This method is applicable only if there is a match between the dimension D of the feature vector to be extracted by the feature extraction unit 202 and the dimension $D_1$ of the token in the encoded expression string.

A second method for acquiring a feature vector is to input the encoded expression 905 corresponding to the class token to a feature vector transformation head 906. This head is typically a feed forward network (hereinafter, FFN) including one or more linear transformations or the like. The FFN is designed to output a D-dimensional vector. The parameters for the FFN are learned by the learning unit 207 in step S308 described below.

The methods for acquiring the feature vector 907 are not limited to the foregoing ones. For example, all the encoded expressions included in the encoded expression string 904 may be connected and the connected expressions may be input to the feature vector transformation head to obtain a D-dimensional vector. In the above-described steps in FIG. 8, the feature amount extraction process in step S303 is performed by the feature extraction unit 202.

Returning to the description with reference to FIG. 3, in step S304, the face classification unit 203 accepts an input of the feature vector extracted by the feature extraction unit 202 and outputs a C-dimensional probability vector. The process by the face classification unit 203 can be implemented by a representative vector method discussed in Deng as an example. In the representative vector method, the face classification unit 203 holds representative vectors $V_1$ to $V_C$ that correspond to respective person IDs (1 to C). The face classification unit 203 calculates an i-th component of the C-dimensional probability vector (i is an integer of 1 or more and C or less) by the inner product of the feature vector output by the feature extraction unit 202 and a representative vector $V_i$.

The learning unit 207 is trained by an error back propagation method described below, such that when an image of which the ground truth person ID is j (j is an integer of 1 or more and C or less) is given, the angle formed by the feature vector extracted from this image and a representative vector $V_j$ becomes as small as possible. Furthermore, the learning unit 207 is trained such that the angle formed by the representative vector $V_j$ and another representative vector becomes as large as possible. This learning method is discussed in Deng.

In step S305, the face classification loss calculation unit 204 calculates a face classification loss from the probability vector output by the face classification unit 203 and the person ID acquired by the data acquisition unit 201. This face classification loss indicates an error in the classification results, and is designed so as to be smaller with a higher probability of the face being classified into a ground truth person class, and be larger with a lower probability of the same. The face classification loss can be calculated using a multi-class cross entropy loss function with a probability vector and a One-Hot vector as inputs. The One-Hot vector here is a C-dimensional vector in which, assuming that the ground truth person ID of the face image is j (j is an integer of 1 or more and C or less), only the j-th component is 1 and the other components are 0.

In step S306, the restoration unit 205 receives the feature vector extracted by the feature extraction unit 202 and restores an image as close to the ideal image as possible (restored image). Any deep network can be used as the restoration unit 205. For example, a deep network including a convolution neural network can be used as the restoration unit 205. Hereinafter, a detailed configuration of the restoration unit 205 will be described.

Figure 11:
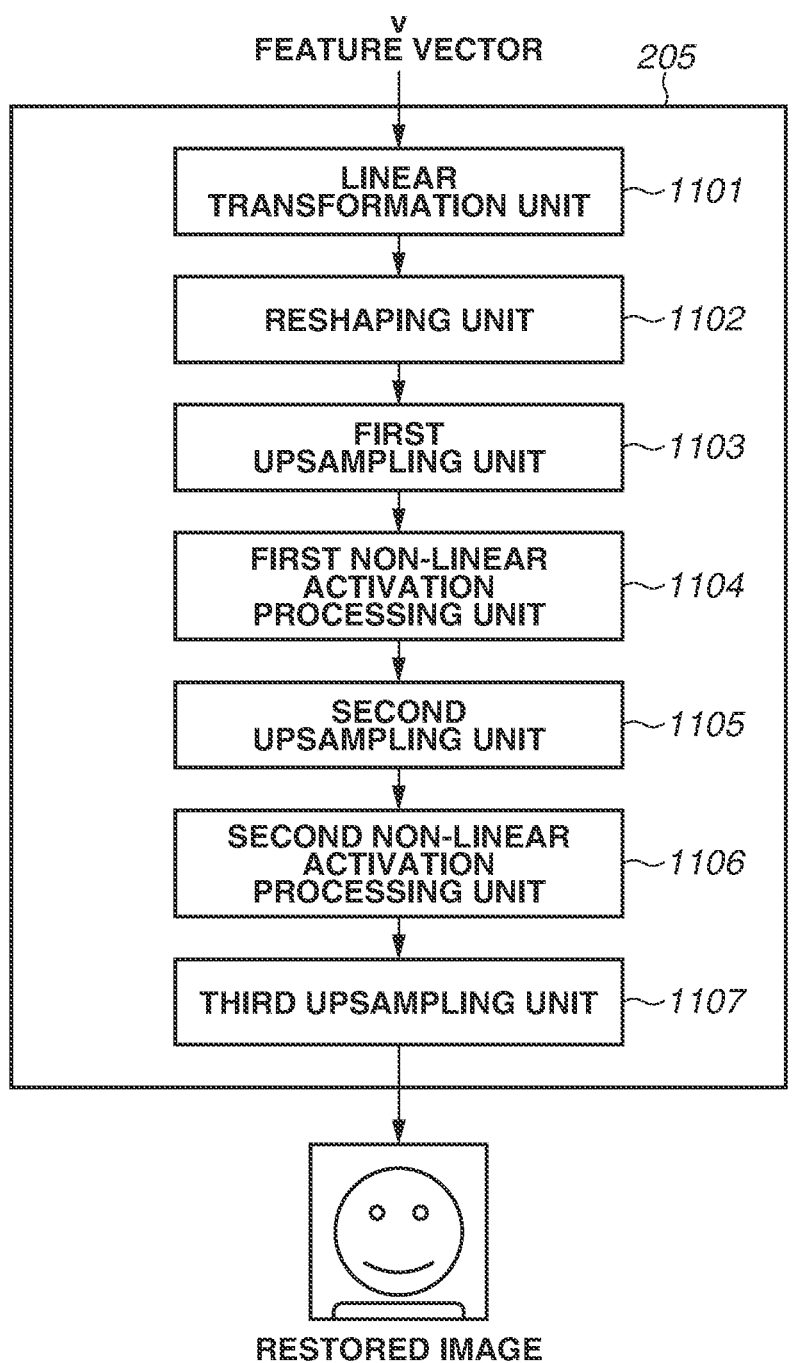
FIG. 11 is a block diagram illustrating a detailed configuration example of a restoration unit.

FIG. 11 is a block diagram illustrating a detailed configuration example of the restoration unit 205.

A linear transformation unit 1101 performs linear transformation of the feature vector extracted by the feature extraction unit 202 into a vector of a different dimension (for example, 4096 dimension). A reshaping unit 1102 reshapes the feature vector having undergone the linear transformation by the linear transformation unit 1101 into a tensor with a width, a height, and a channel direction (for example, the width is 8, the height is 8, and the channel is 64). The parameters for the linear transformation are learned by the learning unit 207 in step S308 described below.

A first upsampling unit 1103 performs a resolution enhancement process on the tensor reshaped by the reshaping unit 1102 to acquire a tensor with a changed resolution (for example, the width is 16, the height is 16, and the channel is 32). The resolution enhancement process is performed by deconvolution or bilinear interpolation, for example. A first non-linear activation processing unit 1104 performs a non-linear activation process such as ReLU on the tensor with the resolution changed by the first upsampling unit 1103.

The second upsampling unit 1105 performs a resolution enhancement process on the tensor having undergone the non-linear activation process by the first non-linear activation processing unit 1104 in a manner similar to that described above to acquire a tensor with a further changed resolution (for example, the width is 32, the height is 32, and the channel is 16). A second non-linear activation processing unit 1106 performs a non-linear activation process such as ReLU on the tensor with the resolution changed by the second upsampling unit 1105.

A third upsampling unit 1107 performs a resolution enhancement process on the tensor having undergone the non-linear activation process by the second non-linear activation processing unit 1106 in a similar manner to acquire a tensor with a further changed resolution (for example, the width is 64, the height is 64, and the channel is 3). Then, the third upsampling unit 1107 outputs this tensor as a restored image. The ideal image and the restored image are not necessarily required to match in resolution.

The configuration of the restoration unit 205 is not limited to the configuration illustrated in FIG. 11. For example, as described above, The Transformer Encoder may be used as the feature extraction unit 202, and a module called "Transformer Decoder" may be used as the restoration unit 205. In this case, the configuration may be changed such that the entire encoded expression string 904 described above may be output to the restoration unit 205 for usage in image restoration.

In step S307, the restoration loss calculation unit 206 calculates a restoration loss from the restored image restored by the restoration unit 205 and the ideal image acquired by the data acquisition unit 201. The restoration loss has a value representing the difference between the ideal image and the restored image, and is designed to be smaller with a smaller difference between the ideal image and the restored image, and to be larger with a larger difference between the ideal image and the restored image. The restoration loss can be defined by an error of mean square in pixel level between the ideal image (already resized at a resolution that is the same as that of the restored image) and the restored image, for example. Specifically, assuming that the lateral width of the restored image is $W_R$ pixels, the vertical lateral width of the restored image is $H_R$ pixels, and the number of channels of the restored image is C, a restoration loss $L_1$ can be calculated by the following equation (2):

$$L_1 = \frac{1}{W_R H_R C} \sum_{w,h,c=1}^{W_R, H_R, C} (I_R(w, h, c) - I_{GT}(w, h, c))^2 \qquad (2)$$

In the equation (2), $I_R(w, h, c)$ represents the value of the c-th channel in the pixel that is the w-th from the left of the restored image and is the h-th from the top of the restored image, $I_{GT}(w, h, c)$ represents the value of the c-th channel in the pixel that is the w-th from the left of the ideal image and is the h-th from the top of the ideal image. However, the definition of a restoration loss is not limited to the above-described one. For example, as discussed in Duan, a term may be added such that the restoration loss becomes smaller as the difference between adjacent pixels in the restored image is smaller, or a term may be added such that the restoration loss becomes smaller as the restored image is closer to symmetry.

In step S308, the learning unit 207 adjusts the parameters held by the feature extraction unit 202, the face classification unit 203, and the restoration unit 205 such that the weighted sum of the face classification loss calculated by the face classification loss calculation unit 204 and the restoration loss calculated by the restoration loss calculation unit 206 is small. This method will be described in order. First, assuming that the face classification loss calculated by the face classification loss calculation unit 204 is $L_0$, the learning unit 207 calculates a loss L in accordance with the following equation (3) by the weighted sum using a preset hyper parameter k:

$$L = L_0 + \lambda L_1 \qquad (3)$$

Next, the learning unit 207 updates the parameters as learning subjects such that the loss L becomes small. The parameters are slightly updated in a direction in which to decrease the loss L by using a general error back propagation method in a deep network. Training the feature extraction unit 202, the face classification unit 203, and the restoration unit 205 such that the loss L becomes small makes it possible to totally optimize the feature extraction unit 202, the face classification unit 203, and the restoration unit 205. In addition, the feature extraction unit 202 can be provided at the same time with a capability of outputting a feature vector with embedded information for restoring an image close to the ideal image from the non-ideal image and a capability of outputting a feature vector for performing accurate face recognition. This allows the feature extraction unit 202 to output feature vectors close to each other from the ideal image and non-ideal image of the identical person.

In step S309, the learning unit 207 determines whether to continue updating of the parameters.

The determination criteria include whether the iterations of learning have reached a sufficient number of times or the performance of the model has been sufficiently improved. If any of these criteria has been reached (YES in step S309), the learning unit 207 determines that the updating of the parameters is to be ended, and the process proceeds to step S310. If this is not the case (NO in step S309), the processing returns to S302. In S302, the learning unit 207 continues learning.

In step S310, the learning unit 207 saves the learned parameters in the storage device 12. The saved parameters are used when the image processing apparatus 100 performs an inference process or performs a learning process again.

Figure 12:
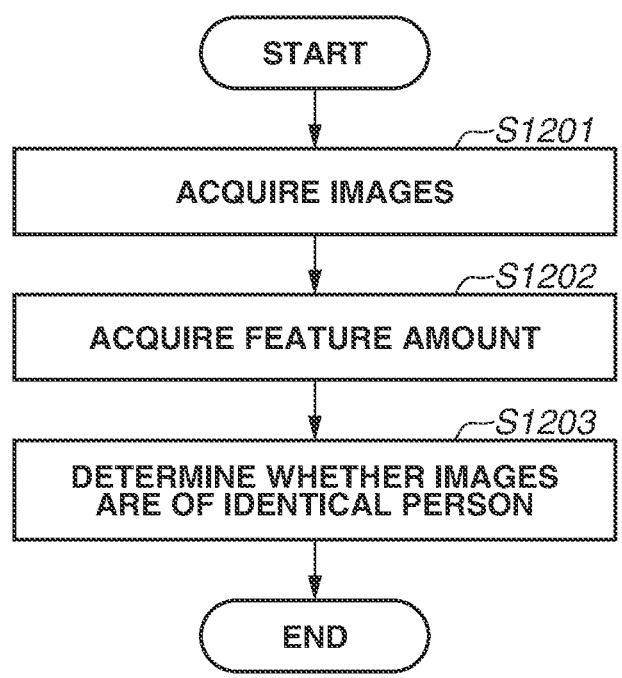
FIG. 12 is a flowchart of an example of a procedure of an inference process by the image processing apparatus.
Figure 13:
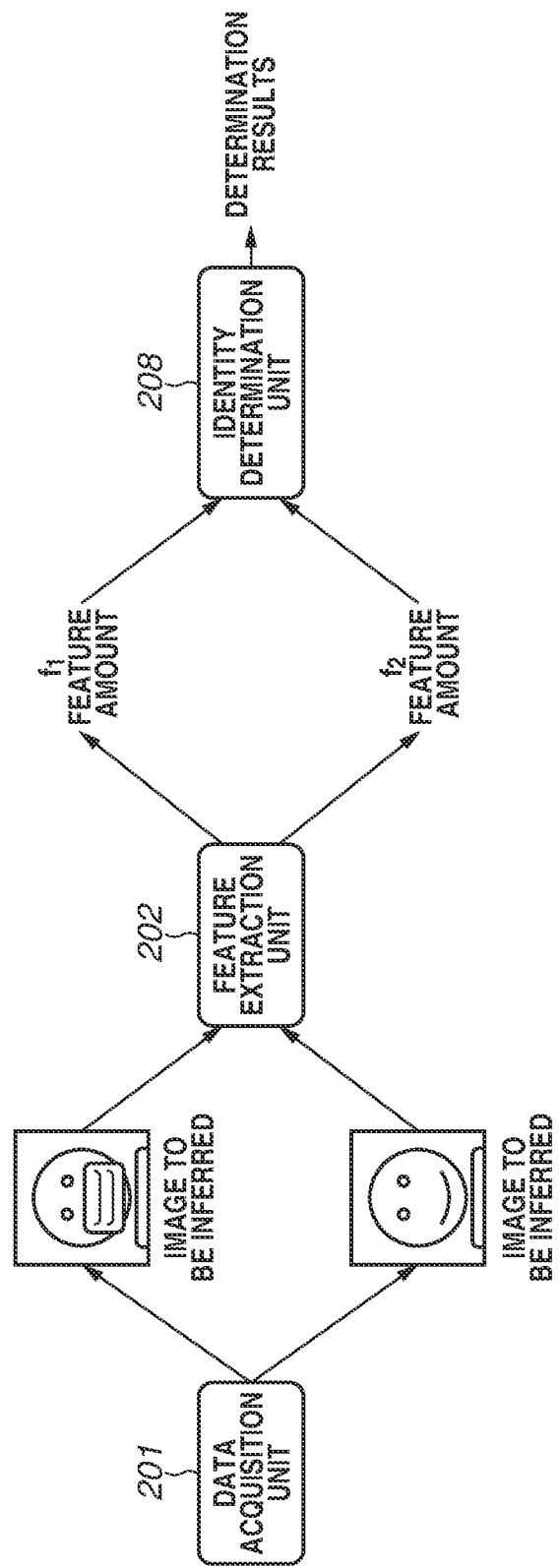
FIG. 13 is a schematic diagram for describing the procedure of the inference process by the image processing apparatus.

Next, an example of a flow of the inference process by the image processing apparatus 100 according to the present exemplary embodiment will be described with reference to the flowchart in FIG. 12 and the schematic diagram in FIG. 13. The inference process is performed by the data acquisition unit 201, the feature extraction unit 202, and the identity determination unit 208.

In step S1201, the data acquisition unit 201 acquires a plurality of images to be inferred of only one person to be subjected to face recognition. The images to be inferred have undergone the normalization process described above in step S302.

In step S1202, the feature extraction unit 202 extracts a D-dimensional feature vector for determining the identity of the faces seen in the face images from the images to be inferred acquired by the data acquisition unit 201, in accordance with the above-described procedure.

In step S1203, the identity determination unit 208 receives the feature vectors extracted by the feature extraction unit 202, and determines whether the faces seen in the images to be inferred are of the identical person. Hereinafter, there is provided an example of a method for determining whether the faces are of the identical person or different persons when feature vectors $f_1$ and $f_2$ extracted from the first image to be inferred and the second image to be inferred, respectively are given.

In this case, the dimension numbers of the feature vectors $f_1$ and $f_2$ are identical.

First, the similarity between the two feature vectors is calculated by a predetermined method. For example, in the case of using cosine similarity, the similarity score is calculated by the following equation (4):

$$\text{Similarity score}(f_1, f_2) := \cos(\theta_{12}) = <f_1, f_2> \div (|f_1| \cdot |f_2|) \quad (4)$$

In the equation (4), $\theta_{12}$ is the angle formed by the feature vectors $f_1$ and $f_2$, $<x, y>$ is the inner product of x and y, and $|x|$ is the length of x. If the similarity score is equal to or lower than a predetermined threshold, the identity determination unit 208 determines that these feature vectors belong to the identical person, and if the similarity score is higher than the threshold, the identity determination unit 208 determines that these feature vectors belong to different persons. The method for calculating the similarity is not limited to the above-described one. Any known method such as a method using the Euclidean distance may be used.

As described above, the image processing apparatus 100 in the present exemplary embodiment updates the parameters held by the feature extraction unit 202, the face classification unit 203, and the restoration unit 205 such that the loss L becomes small. This makes it possible to train the feature extractor and the generator configured to accept feature vectors output from the feature extractor as an input and output a restored image such that the feature extractor and the generator are totally optimized at the same time, thereby improving the performance of the feature extractor.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-207246, filed Dec. 21, 2021, which is hereby incorporated by reference herein in its entirety.

What is claimed is:

1. An image processing apparatus comprising:
a processor; and
a memory storing executable instructions which, when executed by the processor, cause the image processing apparatus to perform operations including:
acquiring a first image that represents an object, a second image that represents the object and is different from the first image in imaging condition, and identification information for identifying the object;
extracting a feature amount from the second image by using an extractor;
classifying the object by using the feature amount and a classifier;
generating a restored image close to the first image from the second image, using the feature amount and a generator; and
training the extractor and the generator such that values corresponding to a first difference between a result of classification of the object and the identification information and a second difference between the restored image and the first image become small.

2. The image processing apparatus according to claim 1, wherein the classifier is trained such that the values corresponding to the first difference and the second difference become small.

3. The image processing apparatus according to claim 1, wherein the first difference is a difference that becomes smaller with a higher possibility that the result of classification of the object relates to the identification information, and the second difference is a difference that becomes smaller as the restored image is closer to the first image.

4. The image processing apparatus according to claim 1, wherein the object is a face.

5. The image processing apparatus according to claim 4, wherein the first image is an image in which the face is oriented at the front and is not occluded.

6. The image processing apparatus according to claim 4, wherein the second image is an image in which the face is oriented with a shift from the front or is at least partially occluded.

7. The image processing apparatus according to claim 1, wherein executing the executable instructions causes the image processing apparatus to perform further operations including:
dividing the second image into a plurality of partial images;
transforming the partial images to tokens that are vectors with a fixed dimension;
adding a class token with a fixed dimension corresponding to the tokens, to a string of the tokens; and
updating the string of the tokens to which the class token is added, based on relevance of the tokens,
wherein a feature amount of the object is extracted from the updated tokens.

8. The image processing apparatus according to claim 7, wherein a query matrix, a key matrix, and a value matrix are determined from the string of the tokens to which the class token is added, an attention matrix reflecting all the tokens and the relevance of all the tokens are determined based on a product of the query matrix and the key matrix, and the string of the tokens is updated based on a product of the attention matrix and the value matrix.

9. The image processing apparatus according to claim 7, wherein vectors related to positions of the partial images before the division are added to the tokens.

10. The image processing apparatus according to claim 1, wherein executing the executable instructions causes the image processing apparatus to perform further operations including: determining, based on feature amounts that are extracted from a plurality of images representing objects, whether the objects represented in the plurality of images are identical.

11. A learning method comprising:
acquiring a first image that represents an object, a second image that represents the object and is different from the first image in imaging condition, and identification information for identifying the object;
extracting a feature amount from the second image by using an extractor;
classifying the object by using the feature amount and a classifier;
restoring by generating a restored image close to the first image from the second image, using the feature amount and a generator; and
training the extractor and the generator such that values corresponding to a first difference between a result of classification of the object and the identification information and a second difference between the restored image and the first image become small.

12. A non-transitory storage medium having a program for causing a computer to execute a learning method comprising:
acquiring a first image that represents an object, a second image that represents the object and is different from the first image in imaging condition, and identification information for identifying the object;
extracting a feature amount from the second image by using an extractor;
classifying the object by using the feature amount and a classifier;
restoring by generating a restored image close to the first image from the second image, using the feature amount and a generator; and
training the extractor and the generator such that values corresponding to a first difference between a result of classification of the object and the identification information and a second difference between the restored image and the first image become small.

* * * * *